United States Patent Office 3,488,811
Patented Jan. 13, 1970

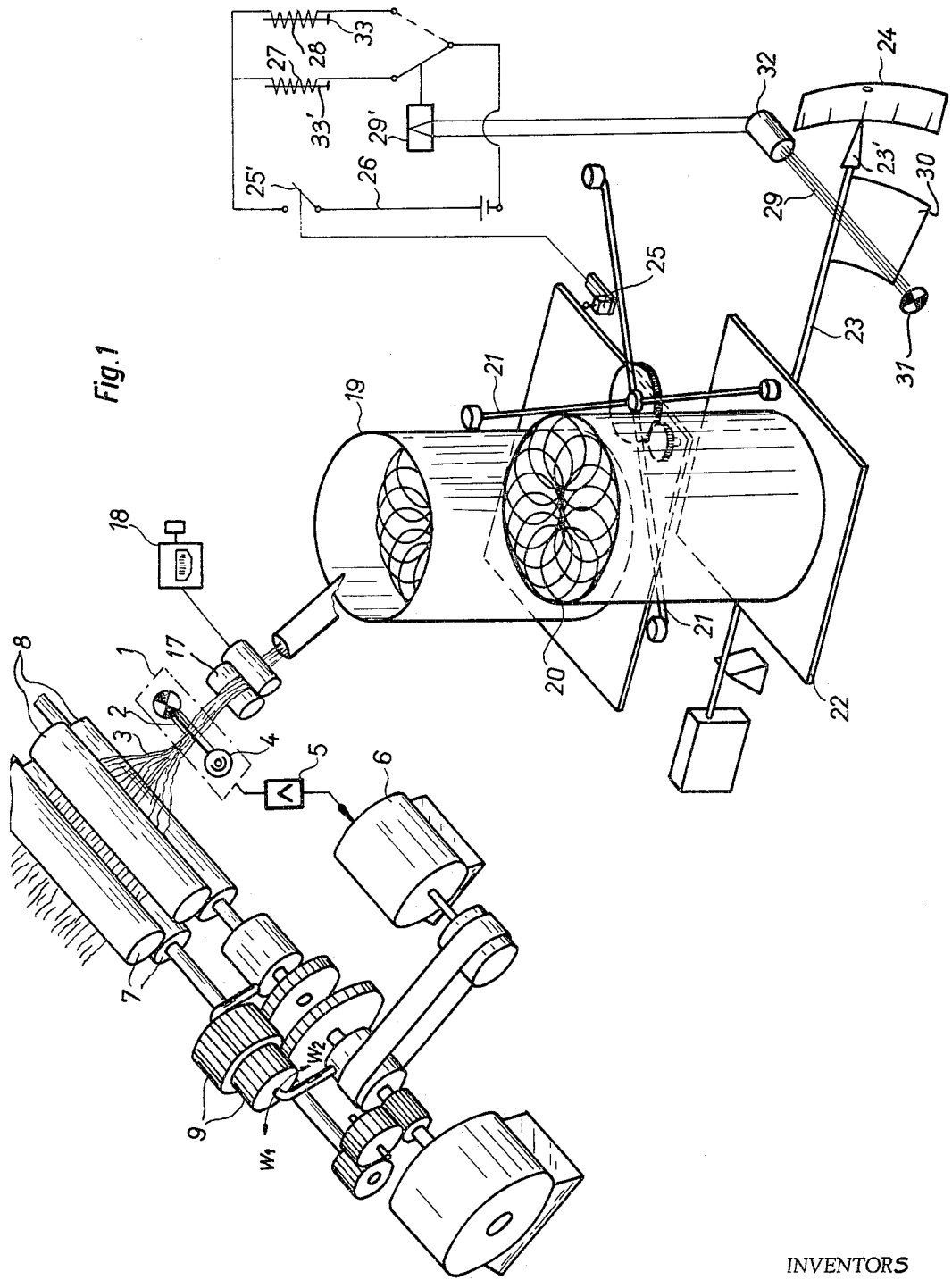
Jan. 13, 1970  R. BINDER ET AL  3,488,811
APPARATUS AND METHOD FOR REGULATING THE DRAFT OF
STAPLE FIBER SLIVER IN A DRAFTING SYSTEM
Filed April 24, 1967  3 Sheets-Sheet 1
INVENTORS
ROLF BINDER
HANSRUEDI LAMPARTER
RUDOLF WILDBOLZ
Kenyon & Kenyon
ATTORNEYS

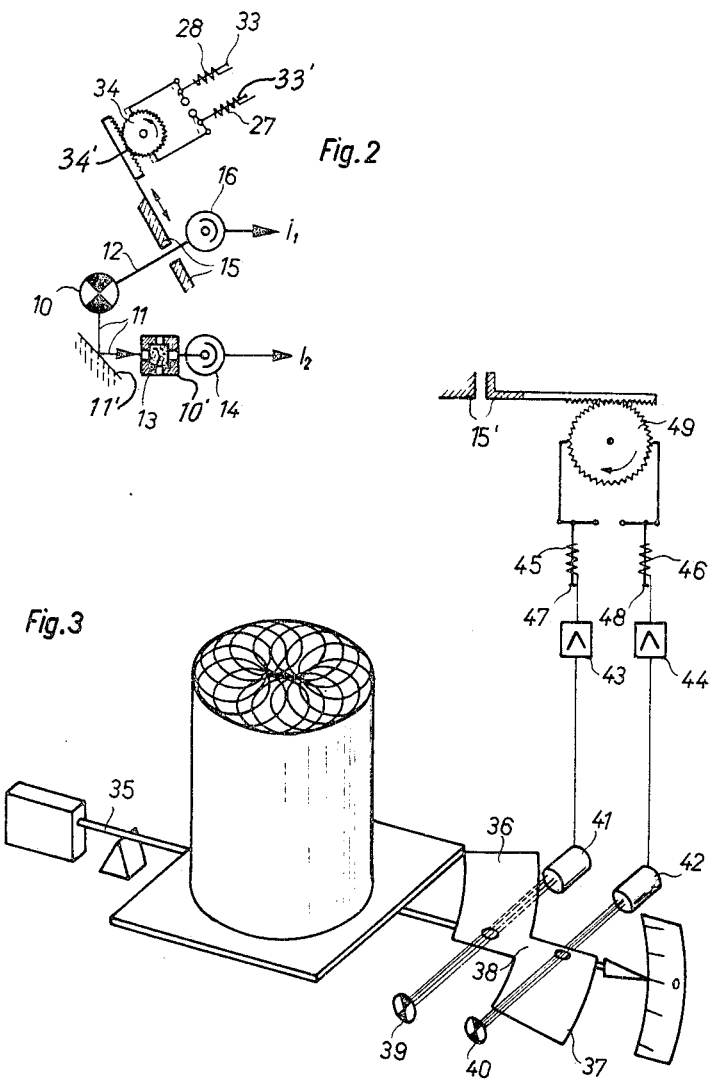

3,488,811
APPARATUS AND METHOD FOR REGULATING THE DRAFT OF STAPLE FIBER SLIVER IN A DRAFTING SYSTEM
Rolf Binder, Hansruedi Lamparter, and Rudolf Wildbolz, Winterthur, Switzerland, assignors to Rieter Machine Works Ltd., Winterthur, Switzerland, a corporation of Switzerland
Filed Apr. 24, 1967, Ser. No. 633,025
Claims priority, application Switzerland, Apr. 27, 1966, 6,132/66
Int. Cl. D01h 5/32
U.S. Cl. 19—240                 20 Claims

ABSTRACT OF THE DISCLOSURE

A drafting system having a first regulating system determining deviations of fibrous mass from a set value to vary the draft of the drafting system and a second regulating system determining deviations of sliver weight per unit length from a nominal value. The second regulating system regulates the set value of the first regulating system to correct the signal controlling the draft of the drafting assembly.

---

The invention relates to an apparatus and method for regulating the draft of staple fiber sliver in a drafting system. More particularly, the invention the relates to an apparatus and method for regulating the draft of staple fiber slivers in a drafting system of a spinnery.

Heretofore, the drafting systems of spinneries have been adjusted for short-periodic disproportions of sliver in reliance on capacitive, optical or pneumatic measuring devices and methods. However, such measuring devices and methods have been unsatisfactory in attempts to satisfactorily adjust the drafting systems for long-periodic fluctuations in the sliver weight. This has been due, on the one hand, to the unsatisfactory stability of the measuring elements and the related signal amplifiers of the measuring devices and, on the other hand, to the shortcomings of the measuring principles utilized in the measuring methods. For example, a capacitive measuring device using a capacitive test head can interfere with the regulation of the draft of the sliver by erroneously indicating weight deviations from a required nominal value where none exist as when the sliver material is conveyed in a modified form during passage through the test head or when the sliver material fluctuates in dimensions under fluctuating humidity conditions. An optical measuring device using an optical test head can likewise interfere with the regulation of the sliver draft where the size or fineness of the fibers of the sliver, the color of the fibers or the reflective properties (shine) of the fibers deviatingly affects the absorption of the electro-magnetic waves of the visible spectrum and, consequently, the adjustment of the draft of the actual fiber mass passing through the test head.

In addition, it has been required in practice to frequently examine the alignment of the measuring elements and amplifiers of the measuring devices in order to make adjustments where necessary. This, however, has required additional continuous control of the quality of the sliver, for example, in sorting out the fiber slivers. Further, these controls are considered as an unreasonable demand on the operation personnel not to mention the reliability required for the performance of the work to meet its object.

Experiments have been known heretofore to overcome these above shortcomings and to eliminate fluctuations in the sliver weight. For example, a procedure to automatically adjust the weight of the fiber slivers per unit of length (known as "sliver-number" in spinning) has been known wherein the draft of a drafting system which deviates for a protracted period from a nominal value due to drift of the measuring element is increased to return the draft to the nominal value. Although this system eliminates misadjustments due to unstable measuring elements and the electro-mechanical means for modulating the number of revolutions of the pair of drafting cylinders of the drafting system, the system does not, however, succeed in adjusting long-periodic sliver-number fluctuations.

Briefly, the invention provides an apparatus having dual draft regulation systems. One draft regulating system has a means for determining the fibrous mass of a textile fiber sliver passing through a confined passage of a guide channel, for example, through the principle of the absorption of electromagnetic waves from a light source. The deviations of fibrous mass from a pre-set value are determined and a signal is produced in response to the deviation which is then used to effect a change in the draft of the drafting assembly. The other draft regulating system has a means for determining the sliver-number of a unit length of sliver received in a can of a can exchange assembly, for example, through a gravimetric principle. The deviations of sliver-number from a nominal value are determined and a signal is produced in response to the type of deviation determined which is then used to adjust the pre-set value of the first regulating system and, consequently, the draft of the drafting assembly.

The method of the invention provides a manner of determining deviations in fibrous mass and sliver weight per unit length of a drafted sliver from nominal values and of regulating the draft of the related drafting assembly in direct response to the combined deviations in order to decrease or increase the draft. The draft is regulated in dependence on deviations in fibrous mass from a pre-set value which in turn is adjusted in dependence on deviations in sliver weight from a nominal value.

Accordingly, it is an object of the invention to regulate the draft of a drafting assembly in dependence on the mass of sliver drafted and the weight per unit length of drafted sliver.

It is another object of the invention to provide an apparatus and method for regulating the draft of a drafting assembly in dependence on sliver mass and weight per unit length of delivered sliver.

It is another object of the invention to provide an apparatus and method of regulating the draft of a drafting assembly in dependence upon a statistical deviation of sliver-number from a nominal value.

These and other objects and advantages of the invention will become more apparent from the following detailed description and appended claims taken in conjunction with the accompanying drawings in which:

FIG. 1 illustrates a schematic-perspective view of an apparatus of the invention;

FIG. 2 illustrates a schematic view of an electromagnetic sliver measuring system;

FIG. 3 illustrates a schematic view of a modified can-exchange system of the invention.

Figure 4:
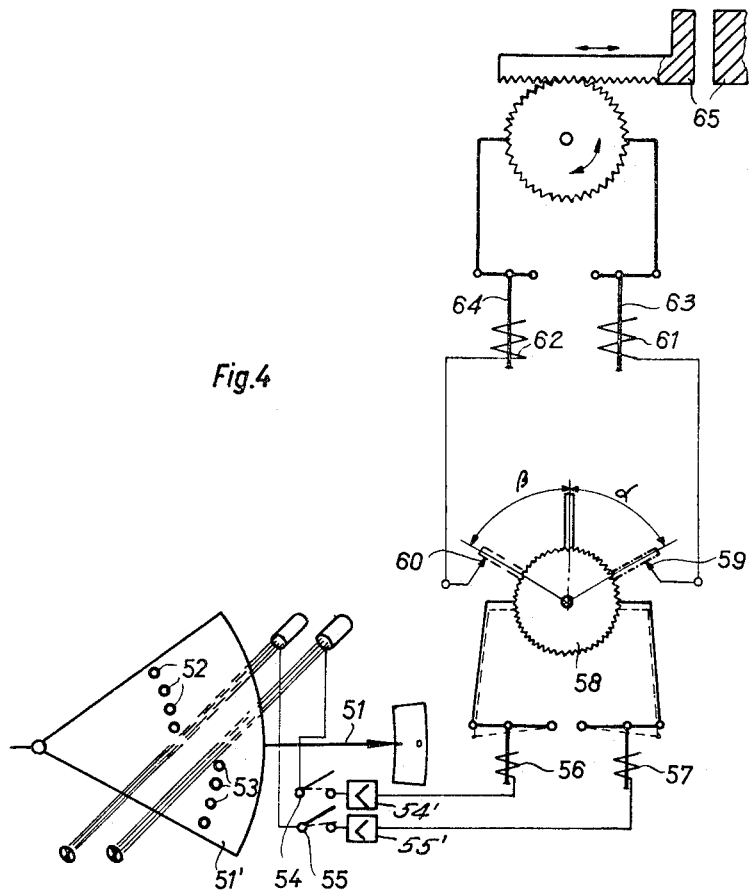
FIG. 4 illustrates a schematic view of another modified can-exchange system of the invention.

Referring to FIG. 1, the apparatus has an electromagnetic sliver measuring system and a can weighing system coupled with a can-exchange assembly which are operatively connected with each other to control the draft of sliver. The electro-magnetic system has an optical scanning system 1 similar to that disclosed in U.S. patent application Ser. No. 325,568, filed Nov. 22, 1963, now Patent No. 3,305,688 which directs visible light 2 through fiber materials 3 of variable stock to a photoelectric cell 4. The fiber materials 3 absorb the electro-magnetic waves of the light to varying degrees depending of the mass of the fiber materials passing through the light and the unabsorbed light passes on to the photoelectric cell 4. The cell 4 emits electrical signals in response to the variable amounts of light received to an impulse amplifier 5 and thence to an electric motor 6 for changing the output speed of the motor to adjust the draft of sliver. The output of the motor 6 in interconnected to the drive of a drafting assembly in a manner similar to that disclosed in the above mentioned patent application to vary the draft between the feed rollers 7 and delivery rollers 8 through a pair of interconnected planet pinions 9. The motor 6 varys the speed ratio between the feed rollers 7 and delivery rollers 8 by changing the angular velocity $W_1$ or $W_2$ in corresponding relation to the signals received from the photoelectric cell 4.

Referring to FIGURES 2, the optical scanning system 1 includes a light source 10, such as a stroboscope lamp, an apertured guide channel 10' through which a compacted length of sliver 13 formed by the fiber materials passes, a photoelectric cell 14, an adjustable shutter 15 and a second photoelectric cell 16 on one side of the shutter 15. The light source substantially simultaneously emits two beams of light 11, 12 one of which is reflected from a reflector 11' through an aperture in the guide channel 10' to penetrate the sliver 13 therein and to subsequently effect the photoelectric cell 14, the other beam of light 12 is directed through the aperture of the shutter 15 which is adjusted to a nominal value to effect the photoelectric cell 16. The photoelectric cells 14, 16 emit respective pulses $i_2$, $i_1$ in response to the light received from the beams 11, 12. The pulses $i_1$, $i_2$ are added algebraically and any differential pulse produced is passed to the impulse amplifier 5. The impulse signal emitted by the impulse amplifier 5 is used to induce the correction of the draft as described above.

Referring again to FIGURE 1, the calendar roller 17 of the drafting assembly is coupled to a length recorder 18 which initiates a change of cans 19, 20 on a guide mechanism (not shown) of the can-receiving station and can-exchange assembly of known construction upon determination of a passage of a predetermined length of sliver into a can to replace the sliver-filled can 20 with an empty can 19. The can-exchanging arms 21 of the can-receiving and can-exchange assembly rotate to move the sliver-filled can 20 onto a weighing table 22 of a can weighing system. The weighing table 22 is secured to a pivotally mounted guide frame 23 which has an indicator means such as a pointer 23' for indicating on a scale 24 the deviation of the weight of the filled can 20 from a nominal value of can contents. The nominal value is represented by the zero position of the scale 24. A timing relay 25 is incorporated in the can-weighing system to be actuated by the rotating arms 21 or by another part of the can-exchange assembly. The timing relay 25 actuates a delay switch 25' of a circuit 26 to complete the circuit for a short time period, or, if so adjusted, to complete and break the circuit sequentially a number of times within the time period. A pair of solenoids 27, 28 are in the circuit 26, one solenoid 27 being held under current by a switch 29'. A light source 31 is positioned adjacent the guide frame 23 to direct a beam of light 29 past the guide frame to a photocell 32 which is interconnected to the switch 29' to control the actuation of the switch 29' between solenoids 27, 28. An opaque member such as flag 30 is attached to the guide frame 23 to move into and out of the beam of light 29 in dependence on the weight of the sliver-filled can 20 on table 22.

In order to compensate for long-periodic instabilities such as drifts in the optical scanning system, the related electronic equipment, or fiber sliver-number, an adjustment in the width of the aperture of shutter 15 is made. This is effected by meshing a rotatably mounted toothed wheel 34 with a corresponding tooth rack 34' on the shutter 15 which is movable to allow an adjustment of the aperture of the shutter and by operatively connecting the toothed wheel 34 to an anchor 33, 33' controlled respectively by the solenoids 27, 28.

In operation, if the sliver-filled can on the weighing table 22 does not contain the nominal weight it should, the guide frame 23 pivots in counterclockwise as viewed in FIGURE 1. This allows the flag 30 to interrupt the beam of light 29 either partially or completely to reduce the intensity of light received on photocell 32. The photocell 32 then actuates the switch 29' into the dotted position of FIGURE 1 to bring solenoid 28 into the circuit 26. Upon subsequently closing of the delay switches 25' by the timing relay 25, the anchor 33 is pulled down with respect to the toothed wheel 34 to rotate the toothed wheel 34 in a counter-clockwise direction as viewed in FIGURE 2. The rotation of wheel 34 causes the rack 34' to reduce the width of aperture of the shutter 15 in increments equal to one or more teeth of wheel 34. The reduction in the shutter aperture gives a reduced impulse $i_1$ which when added to the impulse $i_2$ produces a differential impulse of less value than nominal thereby demanding a higher absorption of electro-magnetic waves by a sliver passing through the guide channel 10' and, consequently, a sliver of greater mass. This smaller differential impulse increases the speed of motor 6 to decrease the draft of the fiber materials 3 to that a sliver of greater weight per unit length is passed into a subsequent can 19.

Conversely, if the sliver-filled can on the weighing table 22 contains more than the nominal weight, the guide frame 23 pivots in a clockwise direction away from the beam of light 29 without interrupting it. Thus, there is no reduction in the intensity of light received on photocell 32 and switch 29' remains in place with solenoid 27 in the circuit 26. Upon subsequent closing of delay switch 25', solenoid 27 receives current and anchor 33' pulls down relative to the toothed wheel 34. This causes wheel 34 to rotate in a direction to open the shutter aperture and to permit more light to pass on to photoelectric cell 16. The greater impulse $i_1$ produced by the photoelectric cell 16 effects a greater differential impulse than nominal to demand a smaller absorption of electro-magnetic waves by the sliver and consequently a sliver of smaller mass. The greater differential impulse decreases the speed of motor 6 to increase the draft of the fiber materials 3 so that a sliver of less weight per unit length is passed into a subsequent can.

The above described operation is designated as a "too heavy-too light" procedure. Where a greater correction interval is required, the timing relay 25 can be constituted so that it actuates the switch 25' only after passage of every second or third arm 21 thereover.

Referring to FIG. 3, a can weighing system having a guide frame 35 similar to that above is provided with opaque members such as flags 36, 37 which are disposed on an intermediate portion 38 in opposite directions to each other and in staggered relation to each other. The intermediate portion 38 has a pointer which is disposed in a level zero position on the scale when indicating the weight of a sliver-filled can of nominal weight. In this position, the intermediate portion 38 completely interrupts the light beams of two light sources, 39, 40 directed toward related photocells 41, 42 so that these photocells cannot emit any light responsive signals to related amplifiers 43, 44. The amplifiers 43, 44 are operatively connected to magnets 45, 46 for activating the magnets to cause movement of anchors 47, 48 when a signal is received by either of the amplifiers. The anchors 47, 48 are coupled to opposite sides of a toothed wheel 49 which is in meshing engagement with the adjustable shutter 15'.

In operation, if an overweight sliver-filled can is being weighed on the guide frame 35, intermediate portion 38 moves downwardly out of the path of light from light source 40 to photocell 42. Magnet 46 is thereafter activated by the higher intensified photo-current to pull anchor 48 in a direction to rotate wheel 49 in a clockwise direction as viewed in FIG. 3. This rotation of wheel 49 causes the aperture of the shutter 15' to be increased in size and, consequently, the draft of the fiber materials is increased. Conversely, if an underweight can is weighed, an analogous reaction and response is caused in anchor 47 through photocell 41 to rotate wheel 49 in a counterclockwise direction to narrow the shutter aperture. This results in a decrease of the draft.

The guide frame 35 is advantageous in designing the width of the intermediate portion 38 to avoid any correction in the draft when the weight deviations of the sliver-filled cans are small and of predetermined size. In such cases, the adjustment mechanism for the shutter react only when the weight deviations exceed predetermined magnitudes. Alternatively, this system can be provided with a sliding register (not shown) which adds the number of too heavy or too light indications of the scales of a number of successive weight recordings. The sliding register can then initiate correction of the draft only when, for example, two, three or four movements of the guide frame successively indicate the same sign (e.g. too heavy), or when the tendency of the majority of several weighings remains the same (e.g. four being too heavy and one, too light). This alternative has the advantage that a correction in the draft is undertaken only by statistically checked variations.

Referring to FIG. 4, another can weighing system includes a guide frame 51 having a pair of arcuately disposed rows of holes 52, 53 in a flag 51' which are arranged in staggered relation and in opposite directions to each other. The holes of each row are spaced equidistant to each other. The photocells associated with the guide frame 51 are each connected through respective switches 54, 55 and amplifiers 54', 55' to respective magnets 56, 57. The magnets 56, 57 are coupled to a switching wheel 58 to rotate the wheel 58 between contacts of one of two circuits 59, 60. Each circuit 59, 60 interconnects with a solenoid 61, 62 and solenoid actuated anchor 63, 64 for controlling the adjustment of the aperture of a shutter 65. In operation, after setting the zero position and opening switches 54, 55 a sliver-filled can is deposited and weighed. The guide frame 51 then swings in either of two directions to a new balance depending on the weight deviation from the nominal value. At the same time, the photocells behind the flag 51' receive a multitude of light impulses which conduct intensified current impulses of like number to magnets 56 or 57 and consequently switch the switching wheel 58 in correspondence with the number of impulses. When the wheel 58 turns a certain angle $\alpha$ or $\beta$, the corresponding circuit 59 or 60 is closed and the corresponding adjustment solenoid 61, 62 including anchor 63, 64 induces adjustment of the shutter aperture accordingly.

This latter structure makes a correction in the nominal value of the draft only when a statistical deviation from the median weight occurs. Thus, not only can the tendency of the can weights to deviate from a nominal value be determined but also the magnitude of deviation.

Having thus described the invention it is not intended that it be so limited as changes may be readily made therein without departing from the scope of the invention. Accordingly, it is intended that the subject matter described above and shown in the drawings be interrupted as illustrative and not in a limiting sense.

What is claimed is:
1. In combination with a drafting assembly for drafting staple fibers and a can-receiving and exchange station for receiving drafted sliver;
   a first draft regulating system having means for determining the fibrous mass of a fiber sliver passing through a guide channel to regulate said drafting assembly; and
   a second draft regulating system operatively interconnected to said first draft regulating system having means for determining the weight of sliver received on said can-receiving and exchange station assembly to adjust said first draft regulating system to regulate said drafting assembly.

2. The combination as set forth in claim 1 wherein said first draft regulating system includes an adjustable shutter having an aperture, a light source for passing a first beam of light through a compacted length of sliver and a second beam of light through the aperture of said shutter, means for receiving said first and second beams of light, and means for producing a differential impulse in response to said received beams of light to regulate said drafting assembly in dependence thereon, and said second draft regulating system includes means for adjusting the aperture of said shutter.

3. The combination as set forth in claim 2 wherein said means for adjusting the aperture of said shutter includes
   scale means for determining weight deviation of a sliver-filled can from a nominal weight value; and
   adjusting means responsive to a deviation from said nominal weight value for adjusting the aperture of said shutter in dependence thereon.

4. The combination as set forth in claim 3 wherein said scale means includes a pivotally mounted guide frame having a weighing table thereon for supporting a sliver-filled can, an indicating means, and an opaque member extending in one direction from said guide frame; and a scale cooperating with said indicating means to indicate a weight deviation from said nominal value.

5. The combination as set forth in claim 4 wherein said adjusting means includes a photocell on one side of said opaque member,
   a light source on the other side of said opaque member for directing a beam of light toward said photocell, said opaque member being disposed out of the path of said beam of light for movement thereinto upon weighing of a sliver-filled can having a weight deviation less than the nominal weight value,
   a movable means engaging a portion of said shutter for varying the opening of said shutter, and
   actuating means interconnected between said photocell and said movable means for receiving a signal from said photocell to move said movable means in one of two opposite directions.

6. The combination as set forth in claim 5 wherein said movable means is a rotatably mounted toothed wheel.

7. The combination as set forth in claim 5 wherein said actuating means includes a pair of reciprocally mounted anchors engaging said movable means and a pair of solenoids, each said solenoid being disposed about a respective anchor to pull said anchor in a direction to move said movable means in one of two opposite directions.

8. The combination as set forth in claim 3 wherein said scale means includes a pivotally mounted guide frame having a weighing table thereon for supporting a sliver-filled can, an indicator means having an intermediate portion and a pair of opaque members on said intermediate portion disposed in opposite directions and in staggered relation to each other and a scale cooperating with said indicator means to indicate a weight deviation from said nominal value, and wherein said adjusting means includes a pair of photocells on respective sides of said opaque members, a pair of light sources on respective opposite sides of said opaque members for directing respective beams of light toward said photocells, said intermediate portion being disposed in the paths of said beams, one of said opaque members being disposed to extend into one of said beams upon weighing of a sliver-filled can having a weight deviation less than the nominal weight value and the other of said opaque members being disposed to extend into the other of said beams upon weighing of a sliver-filled can having a weight deviation more than the nominal weight value, a movable means engaging a portion of said shutter for varying the opening of said shutter and actuating means interconnected between said photocells and said movable means for receiving a signal from one of said photocells to move said movable means in one of two opposite directions.

9. The combination as set forth in claim 3 wherein said scale means includes a pivotally mounted guide frame, an indicator means, an opaque member on said guide frame having a pair of rows of equi-spaced holes disposed in opposite arcuate directions and in staggered relation to each other, and a scale cooperating with said indicator means to indicate a weight deviation from said nominal value; and wherein said adjusting means includes a pair of photocells on one side of said opaque member, a pair of light sources on an opposite side of said opaque member for directing respective beams of light toward said photocells, each of said rows of holes being disposed to move into a respective beam of light upon movement of said opaque member in one of two directions upon deviation of a weighted can from said nominal weight value, a rotatably mounted switching wheel connected to each of said photocells for rotation thereby in one of two opposite directions in response to a signal received from one of said photocells, a movable means engaging a portion of said shutter for varying the opening of said shutter, and actuating means interconnected between said switching wheel and said movable means for receiving a signal from one of said photocells to move said movable means in one of two opposite directions subsequent to weighing of a plurality of sliver-filled cans.

10. In combination with a drafting assembly for drafting staple fibers of a sliver, a first draft regulating system having first means for a determination of deviations of the fibrous mass of the sliver passing through a point outside said drafting assembly from a preset value and a second means for changing the draft ratio of said drafting assembly in response to the deviations determined in order to compensate for said deviations, a second draft regulating system having third means for a determination of deviations in weight of the fibrous mass of the sliver from a preset value positioned downstream of said first means, fourth means responsive to said third means for adjusting said preset value of said first means to compensate for the deviations determined by said third means, said third means determining the deviations of the fibrous mass of the sliver differently from said first means.

11. The combination as set forth in claim 10 wherein said first means is a photoelectric cell scanning device.

12. The combination as set forth in claim 10 wherein said third means includes means for weighing the drafted sliver.

13. A method of regulating the draft of staple fiber sliver in a drafting assembly comprising the steps of determining deviations in fibrous mass of the sliver from a preset value by a first means at one stage associated with the drafting assembly, producing a first signal proportional to such deviations, varying the draft of the drafting assembly in response to said first signal, determining deviations in weight in the fibrous mass of a predetermined length of sliver passing from the drafting assembly at a second stage downstream of said first stage, producing a second signal in response to such deviations of the fibrous mass of the sliver from a nominal value, and adjusting said preset value in response to said second signal, said determining of deviations at the second stage being different from the determining of deviations at said first stage.

14. A method as set forth in claim 13 wherein said second signal is produced in response to a plurality of successive deviations of a respective plurality of lengths of sliver.

15. A method as set forth in claim 13 wherein said second signal is produced in response to deviations in excess of a predetermined deviation from the nominal value.

16. A method as set forth in claim 13 wherein said second signal is produced in response to deviations in weight of lengths of sliver taken at equal intervals of delivery from the drafting assembly.

17. A method as set forth in claim 13 wherein said second signal is produced in response to a first length of sliver and said pre-set value is adjusted to vary the draft of a subsequent length of sliver.

18. A method as set forth in claim 13 wherein said second signal is produced after determination of a predetermined allowable minimum deviation and said pre-set value is adjusted to a predetermined amount in response thereto.

19. A method as set forth in claim 13 wherein said second signal is produced after determination of the magnitude of a deviation and said pre-set value is adjusted in proportion to said magnitude of deviation.

20. A method as set forth in claim 13 wherein said second signal is produced after summing of a plurality of successive deviations and the sum thus obtained exceeds a predetermined magnitude.

References Cited

UNITED STATES PATENTS

| | | | |
|---|---|---|---|
| 3,109,204 | 11/1963 | Linnert et al. | 19—241 |
| 2,407,100 | 9/1946 | Richardson | 19—240 |

DORSEY NEWTON, Primary Examiner